United States Patent [19]

Schmitt

[11] 4,022,736
[45] May 10, 1977

[54] FREEZE-THAW STABLE, SELF-INVERTING, WATER-IN-OIL EMULSION

[75] Inventor: Joseph Michael Schmitt, Ridgefield, Conn.

[73] Assignee: American Cyanamid Company, Stamford, Conn.

[22] Filed: Oct. 22, 1975

[21] Appl. No.: 624,625

[52] U.S. Cl. .................. 260/29.6 E; 260/29.6 MH; 260/29.6 WQ; 260/29.6 H
[51] Int. Cl.² .................................. C08L 33/02
[58] Field of Search .............. 260/29.6 E, 29.6 MH, 260/29.6 WQ, 29.6 H

[56] References Cited

UNITED STATES PATENTS

| | | | |
|---|---|---|---|
| 3,284,393 | 11/1966 | Vanderhoff et al. | 260/29.6 HN |
| 3,624,019 | 11/1971 | Anderson et al. | 260/29.6 HN |
| 3,852,234 | 12/1974 | Venema | 260/29.6 H |
| R28,576 | 10/1975 | Anderson et al. | 260/29.6 HN |

*Primary Examiner*—M. J. Welsh
*Attorney, Agent, or Firm*—Frank M. Van Riet

[57] ABSTRACT

A freeze-thaw stable, self-inverting, water-in-oil emulsion comprising an aqueous phase of a copolymer of acrylic acid, a hydrocarbon oil, a water-in-oil emulsifying agent and an inverting surfactant comprising a fatty alcohol-ethylene oxide reaction product and a method for the preparation thereof.

9 Claims, No Drawings

FREEZE-THAW STABLE, SELF-INVERTING, WATER-IN-OIL EMULSION

BACKGROUND OF THE INVENTION

Polymeric emulsions of acrylamide and an acrylic acid which are effective flocculants for many substrates including sewage, cellulose fibers and fines for retention and freeness, metal ore treatment, plating waste, coal trailings, steel mill flue ducts and sinter fines, potable water have become increasingly important in recent years. These emulsions are usually of the water-in-oil variety and are inverted, by the addition of water thereto, to oil-in-water emulsions during which the polymer is rapidly dissolved in the water. Emulsions and dissolution procedures of this type are disclosed in U.S. Pat. Nos. RE 28,474, 3,826,771, and 3,284,393, which patents are hereby incorporated herein by reference.

While these emulsions are very effective when used as flocculants, they tend to be materially reduced in their effectiveness when they are subjected to alternating freezing and thawing temperature such as would exist in many areas during the winter season. The repeated temperature cycles tend to cause the emulsions to coagulate, i.e., form into large clumps of polymer rather than remain finely dispersed particles and, as a result, the flocculating effectiveness of the emulsions are drastically reduced.

SUMMARY OF THE INVENTION

The novel emulsions of the present invention exhibit excellent freeze-thaw properties, that is, they do not form into clumps to the extent that they are rendered useless as flocculants when subjected to freeze-thaw conditions. In addition to exhibiting stability under freeze-thaw conditions, the emulsions of the present invention also retain all the other attractive properties exhibited by existing emulsions such as high temperature stability, full inversion upon dilution with water, good tolerance to hard water and good dispersion of oil in water after inversion.

This combination of excellent properties is achieved by the use of a critical partially neutralized acrylic acid in the copolymer, and a critical amount of inverting surfactant.

BACKGROUND OF THE INVENTION INCLUDING PREFERRED EMBODIMENTS

The present invention comprises a freeze-thaw stable, self-inverting, water-in-oil emulsion containing a dispersion therein of finely-divided copolymer particles, said emulsion comprising:

A. an aqueous phase ranging from about 70% to about 95%, by weight, based on the total weight of A and B, which is comprised of
  1. a water-soluble acrylamide-acrylic acid copolymer, wherein said acrylic acid is from about 50% to about 75% neutralized, containing from about 25% to about 35%, by weight, based on the total weight of the copolymer of said acrylic acid, and having a concentration of from about 27% to about 68%, by weight, based on the total weight of (A), and
  2. water, in an amount ranging from about 32% to about 73%, by weight, based on the total weight of (A), B. a liquid hydrocarbon oil in an amount ranging from about 5% to about 30%, by weight, based on the total weight of A and B, C. a water-in-oil emulsifying agent disposed between said aqueous phase and said liquid hydrocarbon at a concentration ranging from about 0.1% to about 15.0%, by weight, based on the total weight of A, B and C, and D. an inverting surfactant comprising the reaction product of about one mole of a fatty alcohol of about 12-18 carbon atoms with from about 6-10 moles of ethylene oxide in an amount ranging from more than about 2.0% and not over about 3.2%, by weight, based on the total weight of A, B, C and D.

As can be seen, the aqueous phase of my novel emulsions is comprised of the acrylamide-acrylic acid copolymer and water. The copolymer contains 65–75% of acrylamide and 25–35% of acrylic acid. The acrylic acid must be from about 50% to about 75% neutralized to impart the freeze-thaw stability mentioned above to the final composition. Neutralization of the acrylic acid is preferably effected before the monomers are copolymerized; however, it can be conducted after copolymerization, if desired. Neutralization is effected by contacting the acrylic acid monomer in aqueous solution with an appropriate amount of any known neutralization agent such as the alkali and alkaline earth metal hydroxides, ammonium hydroxide, amines and the like, as is known in the art. The pH of the resultant aqueous phase will then range from about 4.5 to about 5.5.

In the preferred sequence, the acrylamide and acrylic acid are dissolved in water to attain the desired solids concentration and a suitable chelating agent such as ethylenediaminetetraacetic acid disodium salt is added to chelate metal ions which may be present in the system such as that which may have been incorporated into the acrylamide during its production. The neutralization of the acrylic acid follows, a small amount of iron having preferably been added as a component of the initiator system, as more fully discussed hereinbelow. The oxidant part of the redox (as discussed below) catalyst system is preferably added to the aqueous phase at this time, or later as described below.

After the aqueous phase has been formed as above, it is poured into the oil phase which, at this time, constitutes a solution of the oil and a water-in-oil emulsifier. Any known oil may be used for this purpose such as those set forth in the above incorporated U.S. patents. A preferred oil useful for this purpose is a commercially available product sold under the trademark AMSCO OMS by the Union Oil Co. of California. It is a clear, oily liquid comprising approximately 86.9% paraffins, 13.0% naphthenes and 0.1% aromatics. It has a molecular weight of about 170, a Specific Gravity of 0.755 at 60° F., a Viscosity of 1.4 cps. at 77° F., a Freezing Point below −25° F., a Boiling Point of 399° F., a Flash Point TCC of 126° F. and is insoluble in water. Its Specific Heat is 0.499BTU/16.° F. at 100° F. and 0.588 BTU/16.° F. at 200° F.

Any available water-in-oil emulsifier may be employed, those set forth in the above U.S. Patents being exemplary. A preferred emulsifier is sorbitan monooleate.

After the water-in-oil emulsion is formed by agitation of the oil and water phases to insure uniform blending, the oxidant part of the redox catalyst system may be added, if it had not been added previously as described above. This ingredient is added as an aqueous solution of the monomer emulsion in its complete concentration, i.e., from about 10 parts to about 500 parts per million parts of monomers, preferably 25–150 ppm. Any redox catalyst system can be used herein such as the bromate-sulfite systems; the peroxide-sulfite systems; the hydroperoxide-bisulfite systems, etc. Additionally, other free-radical catalyst systems may be employed, e.g., azobisisobutyronitrile, benzoyl peroxide, lauroyl peroxide; potassium persulfate and the like as is known in the art. When the single component catalyst systems are employed, they are not added to the monomer emulsion until conversion of the monomers to polymer is desired. In the preferred aspect of this invention, however, the oxidant portion of a redox catalyst system comprising t-butyl hydroperoxide and sodium metabisulfite, is added to the monomer emulsion first. The catalyst system perferably also utilizes from about 1 ppm to about 10 ppm of iron, based on monomers, as a component thereof, which iron can be extraneously added to the aqueous phase as mentioned above or can be present as an inherent ingredient in the water or monomers per se. The reducing portion of the redox catalyst should be employed in amounts ranging from about 10 ppm to about 500 ppm based on monomers, preferably 50–200 ppm.

After the reaction mixture is prepared in the above manner, the system is then sparged with nitrogen gas to remove all oxygen from the system and the reducing portion of the catalyst system is then pumped into the monomer emulsion containing the oxidant portion of the catalyst over a period of from about 2 to about 24 hours, i.e., until substantially complete conversion is accomplished, preferably about 4–16 hours, the longer times being necessitated by the lower concentration of catalyst and vice versa. The temperature of the reaction media should be maintained at from about 25° C. to about 55° C., preferably 35° C.–45° C.

After the catalyst component has been added and copolymerization is substantially complete, stabilization of the resultant copolymer is effected by the addition of a further quantity of sodium metabisulfite, i.e., the reducing portion of the catalyst at copolymerization temperature to stabilize the copolymer.

The novel, so-called one-package, emulsion of the present invention, so called because inversion thereof can be accomplished by the addition of water only, is then produced by adding more than about 2.0% and not over 3.2% of the above inverting surfactant thereto. This range is critical in that if 2.0% or less is added, the water-in-oil emulsion will only partially invert to an oil-in-water emulsion and if more than 3.2% is employed, the resultant water-in-oil emulsion is too viscous to handle efficiently and the freeze-thaw stability is reduced. Additionally, I have found that the lower concentrations are effective when the inverted emulsion is to be used to treat water which has a trace to moderate quantity calcium, but when the water to be treated contains substantial calcium, the larger amounts of inverting surfactant may be required.

The following examples are set forth for purposes of illustration only and are not to be construed as limitations on the present invention except as set forth in the appended claims. All parts and percentages are by weight unless otherwise specified.

EXAMPLE 1

To a suitable reaction vessel are added 313.0 parts of acrylamide, as a 47.3% aqueous solution, 64.0 parts of acrylic acid and 167.0 parts of deionized water. To the resultant solution are added 39.6 parts of conc. ammonium hydroxide (28.6% $NH_3$) which neutralizes 75% of the carboxyl groups of the acrylic acid. The resultant solution has a pH of about 5.3. To this solution is added 0.848 part of the disodium salt of ethylenediamine tetraacetic acid and 0.23 part of hydrated ferric sulfate (72% $Fe_2(SO_4)_3$) used as 4.5 parts/1000 parts $H_2O$). This constitutes the aqueous monomer phase.

The oil phase is prepared by dissolving 18.0 parts of sorbitan monooleate in 208.0 parts of AMSCO OMS, a commercially available, clear oily liquid sold by Union Oil Co. of California.

To a suitable, high speed homogenizer is added the complete oil phase system. The homogenizer is started and the monomer aqueous phase is slowly added thereto to form an emulsion having a viscosity of 725 cps. The dispersed phase of the resultant emulsion has a particle size of about 2.5 microns or less.

To a suitable reaction vessel is added the complete emulsion system with stirring. 70.0 parts per million (based on monomer) of t-butyl hydroperoxide are added. The resultant media is purged with nitrogen gas to remove oxygen from the system. Stirring continues, and sodium metabisulfite is slowly pumped into the vessel over a period of 6 hours while maintaining the vessel at about 40° C. after which about 200 parts per million (based on monomer) have been added. The resultant viscous emulsion exhibits 98.97% conversion of acrylamide and 99.10% conversion of acrylic acid. The polymer solids are 25.48% and the Standard Viscosity is 6.6 cps. The pH is 4.8.

Stabilization of the polymer emulsion is accomplished by adding 27.6 parts of a 30% aqueous sodium metabisulfite solution. The emulsion is maintained under polymerizing conditions (60 minutes at 40° C.) to substantially completely react the remaining acrylamide and acrylic acid. 0.4% of the emulsion comprises bisulfite which effects stabilization of the copolymer system.

To the resultant copolymer emulsion are added, as inverting agent over a period of 30 minutes, sufficient parts of the reaction product of one mole of a mixture of $C_{12}$–$C_{14}$ aliphatic alcohols and 7 moles of ethylene oxide to give a final product containing 2.3% of said reaction product, again at 40° C. The resultant emulsion is held at 40° C. for an additional hour after which time the product is smooth and particle free and is shown to have a viscosity of 650 cps. The dispersed polymer phase particle size has a particle size of 2.5 microns or less. The Standard Viscosity is 6.4 cps. The final copolymer solids content is 24.80%.

25.0 Parts of the final emulsion are placed in a suitable vessel and subjected to a temperature of −10° C. for 22 hours. The cold vessel is allowed to warm to room temperature over 2 hours and a count is made of the microscopic coagulated particles therein by pouring the emulsion slowly into a second vessel and counting the particles as they pass from one vessel to the other. After the count is established, the entire emulsion is returned to the first vessel and held again at −10° C. for 22 hours. The cycle is continued for 13 days.

A second emulsion, identical to that prepared above except the acrylic acid in the emulsion is less than about 10% neutralized is then also subjected to the same Freeze-Thaw test. The results are set forth in Table I below. The weekly cycles were frozen and thawed at weekly intervals.

TABLE I

| Daily Cycles | Emulsion of Example 1 Particle Count | Second Emulsion- 10% Neutralized Particle Count |
|---|---|---|
| Initial Count* | 1 | |
| 1 | 1 | insipient |
| 2 | 1 | failure** |
| 3 | 1 | after |
| 4 | 2 | 4 |
| 5 | 2 | cycles |
| 6 | 4 | |
| 7 | 7 | |
| 8 | 4 | |
| 9 | 4 | |
| 10 | 4 | |
| 11 | 14 | |
| 12 | 30 | |
| 13 | 43** | |

| Weekly Cycles | Emulsion of Example 1 Particle Count | Second Emulsion- 10% Neutralized Particle Count |
|---|---|---|
| Initial Count* | 0 | 0 |
| 1 | 0 | 3 |
| 2 | 0 | 6 |
| 3 | 1 | 18 |
| 4 | 3 | 35 |
| 5 | 3 | 62 |
| 6 | 12 | — |
| 7 | 17 | — |

*Particle counts per 25 g. of emulsion.
**40 or more particles constitutes insipient failure. The emulsion can be inverted but the rate of dissolution of the copolymer into solution is materially decreased.

A second portion of the emulsion of Example 1 is subjected to high temperature along with a second portion of the 10% neutralized emulsion to determine their stability toward loss of molecular weight as measured by Standard Viscosity. At 50° C. and 60° C. the emulsion of Example 1 is stable 6 weeks and 2–3 weeks, respectively, while the 10% neutralized sample is stable 3–4 and 1–2 weeks, respectively.

Inversion of a third portion of the emulsion of Example 1 is effected by injecting the portion into a rapidly agitated water. Inversion is substantially complete within about 30 minutes.

Inversion of a fourth sample of the emulsion of Example 1 is again conducted except that the rapidly agitated water contains $CaCl_2$ calculated as 750 ppm $CaCO_3$. Inversion is measured as about 93% based on the inversion of said third portion.

Both the third and fourth inverted samples above exhibit little or no separation after standing at room temperature for 24 hours indicating excellent dispersion of the oil in the water phase.

EXAMPLE 2

The procedure of Example 1 is again followed but the acrylic acid is replaced by an equivalent amount of methacrylic acid. Similar results are achieved.

EXAMPLES 3 & 4

The procedure of Example 1 is again followed except that (3) 53.5 parts of acrylic acid and 158 parts of acrylamide monomer and (4) 74.5 parts of acrylic acid and 137 parts of acrylamide monomer, respectively, are used. Again, excellent freeze-thaw stability, high temperature stability, inversion and calcium tolerance are observed. No separation of the inverted emulsion is recorded on standing at ambient temperature for 24 hours.

EXAMPLE 5

Again following the procedure of Example 1 except that the percentage of ethylene oxide-aliphatic alcohol reaction product is increased to 3.2%, essentially complete inversion is achieved when water containing 750 ppm of calcium carbonate (added as calcium chloride) is used as the solvent.

EXAMPLE 6

The ethylene oxide-aliphatic alcohol reaction product of Example 1 is replaced by an equivalent amount of a reaction product of one mole of a $C_{18}$ aliphatic alcohol and 10 moles of ethylene oxide. Substantially identical results are achieved.

EXAMPLE 7

The procedure of Example 1 is again followed except that the neutralization of the acrylic acid is increased to 87%. When the resultant emulsion is inverted with the inversion agent, the viscosity of the resultant copolymer solution is such that handling of the material is extremely difficult at 0.2% solution.

Example 8

The procedure of Example 1 is again followed except that the neutralization of the acrylic acid is reduced to 50%. Substantially equivalent results are observed.

EXAMPLE 9

Again following the procedure of Example 1 except that the acrylic acid is neutralized to about 60%, the freeze-thaw test results are as set forth in Table II, below.

TABLE II

| Daily Cycles | Emulsion of Ex. 9 Particle Count |
|---|---|
| Initial Count | 0 |
| 1 | 0 |
| 2 | 2 |
| 3 | 2 |
| 4 | 8 |
| 5 | 13 |

I claim:
1. A freeze-thaw stable, self-inverting, water-in-oil emulsion containing a dispersion therein of finely-divided copolymer particles, said emulsion comprising:
   A. an aqueous phase ranging from about 75% to about 95%, by weight, based on the total weight of A and B, which is comprised of:
   1. a water soluble acrylamide-acrylic acid copolymer containing from about 25% to about 35%, by weight, based on the total weight of the copolymer, of an acrylic acid, the acrylic acid in said copolymer being from about 50% to about 75% neutralized and having a concentration from about 27% to about 68%, by weight based on the total weight of A, and
   2. water in an amount ranging from about 32% to about 73%, by weight, based on the total weight of A,
   B. a liquid hydrocarbon oil in an amount ranging from about 5% to about 25%, by weight, based on the total weight of A and B,
   C. a water-in-oil emulsifying agent disposed between said aqueous phase and said liquid hydrocarbon at a concentration of about 0.1% to about 15.0%, by weight, based on the total weight of A, B and C and
   D. an inverting surfactant comprising the reaction product of about one mole of a fatty alcohol of about 12–18 carbon atoms with from about 6–10 moles of ethylene oxide in an amount ranging from more than about 2.0% to not over about 3.2%, by weight, based on the total weight of A, B, C and D.

2. An emulsion according to claim 1 wherein said copolymer comprises about 70% acrylamide and about 30% acrylic acid.

3. An emulsion according to claim 1 wherein said acrylic acid is about 60% neutralized.

4. An emulsion according to claim 1 wherein said inverting surfactant comprises about one mole of a mixture of $C_{12}$–$C_{14}$ aliphatic alcohols reacted with about 7 moles of ethylene oxide.

5. An emulsion according to claim 1 wherein said water phase comprises about 67% water and 33% copolymer.

6. An emulsion according to claim 1 wherein the amount of said inverting surfactant comprises about 2.3%.

7. A method of preparing the freeze-thaw stable emulsion of claim 1 which comprises:
   A. forming a water-in-oil emulsion of
      1. from about 75% to about 95%, by weight, based on the total weight of 1 and 2, of a solution of
         a. a mixture of acrylamide and an acrylic acid containing from about 25% to about 35%, by weight, based on the total weight of the mixture, of a 50–75% neutralized acrylic acid, having a concentration from about 27% and about 68%, by weight, based on the total weight of a and b, and
         b. water, in an amount ranging from about 32%, to about 73%, by weight, based on the total weight of a and b,
      2. a liquid hydrocarbon oil in an amount ranging from about 5% to about 25%, by weight, based on the total weight of 1 and 2,
      3. a water-in-oil emulsifying agent in a concentration of about 0.1% to about 15.0%, by weight, based on the total weight of 1, 2 and 3, and
      4. a free radical initiator comprising sodium metabisulfite and a hydroperoxide,
   B. polymerizing said monomers under free-radical polymerizing conditions to form a water-in-oil emulsion which contains dispersed therein finely divided particles of a copolymer of said acrylamide and said neutralized acrylic acid, and
   C. adding to said oil-in-water emulsion more than about 2.0% and not over 3.2%, by weight, based on the total weight of said 1, 2, 3 and C, of an inverting surfactant comprising the reaction product of about one mole of a fatty alcohol of about one mole of a fatty alcohol of about 12–18 carbon atoms with from about 6–15 moles of ethylene oxide.

8. A method according to claim 7 wherein said monomer mixture comprises about 70% acrylamide and about 30% of an acrylic acid.

9. A method according to claim 7 wherein said acrylic acid is about 60% neutralized.

* * * * *